US010020684B2

United States Patent
Porat et al.

(10) Patent No.: US 10,020,684 B2
(45) Date of Patent: Jul. 10, 2018

(54) APPARATUS, SYSTEM AND METHOD OF MULTIPLE DEVICE WIRELESS POWER TRANSFER

(71) Applicant: INTEL CORPORATION, Santa Clara, CA (US)

(72) Inventors: Shahar Porat, Ein Carmel (IL); Don J. Ngyuen, Portland, OR (US); Gary N. Matos, Portland, OR (US); Evan R. Green, Tualatin, OR (US); Adam D. Rea, Lynnwood, WA (US)

(73) Assignee: INTEL CORPORATION, Santa Clara, CA (US)

( * ) Notice: Subject to any disclaimer, the term of this patent is extended or adjusted under 35 U.S.C. 154(b) by 143 days.

(21) Appl. No.: 14/780,004

(22) PCT Filed: Dec. 27, 2013

(86) PCT No.: PCT/US2013/077903
§ 371 (c)(1),
(2) Date: Sep. 25, 2015

(87) PCT Pub. No.: WO2015/009328
PCT Pub. Date: Jan. 22, 2015

(65) Prior Publication Data
US 2016/0043563 A1 Feb. 11, 2016

Related U.S. Application Data

(60) Provisional application No. 61/856,149, filed on Jul. 19, 2013.

(51) Int. Cl.
*H02J 50/12* (2016.01)
*H02J 50/60* (2016.01)
(Continued)

(52) U.S. Cl.
CPC .............. *H02J 50/12* (2016.02); *H02J 5/005* (2013.01); *H02J 7/025* (2013.01); *H02J 50/10* (2016.02);
(Continued)

(58) Field of Classification Search
CPC .. H02J 5/005; H02J 50/80; H02J 50/40; H02J 50/10; H02J 7/025; H02J 50/12
See application file for complete search history.

(56) References Cited

U.S. PATENT DOCUMENTS

| 5,734,254 A | 3/1998 | Stephens |
| 6,473,070 B2 | 10/2002 | Mishra et al. |

(Continued)

FOREIGN PATENT DOCUMENTS

| EP | 1432097 | 6/2004 |
| GB | 2414121 | 11/2005 |

(Continued)

OTHER PUBLICATIONS

European Search Report for European Patent Application No. 13889634.5 dated Feb. 15, 2017, 7 pages.
(Continued)

*Primary Examiner* — Jung Kim
(74) *Attorney, Agent, or Firm* — Shichrur & Co.

(57) ABSTRACT

Some demonstrative embodiments include apparatuses, systems and/or methods of wireless power transfer. For example, an apparatus may include a wireless power controller to communicate between a Wireless Power Receiver (WPR) and a Wireless Power Transmitter (WPT) an indication of a requested amount of power to be provided from the WPT to the WPR via a wireless power signal, said indication is in the form of a load modulation event within a predefined time interval, said load modulation event comprises a change in a level of a magnetic field of said wireless (Continued)

power signal, a duration of said load modulation event is based on the requested amount of power to be provided from the WPT to the WPR.

13 Claims, 5 Drawing Sheets

(51) Int. Cl.
*H02J 50/90* (2016.01)
*H02J 5/00* (2016.01)
*H02J 7/02* (2016.01)
*H02J 50/10* (2016.01)
*H02J 50/40* (2016.01)
*H02J 50/80* (2016.01)

(52) U.S. Cl.
CPC .............. *H02J 50/40* (2016.02); *H02J 50/60* (2016.02); *H02J 50/80* (2016.02); *H02J 50/90* (2016.02)

(56) References Cited

U.S. PATENT DOCUMENTS

| | | | |
|---|---|---|---|
| 8,989,657 | B2 | 3/2015 | McManus et al. |
| 2010/0133917 | A1 | 6/2010 | Sekino et al. |
| 2010/0253442 | A1 | 10/2010 | Mu |
| 2010/0262846 | A1 | 10/2010 | Sato |
| 2011/0136452 | A1 | 6/2011 | Pratt et al. |
| 2012/0025624 | A1 | 2/2012 | Lee et al. |
| 2012/0149303 | A1 | 6/2012 | Moes et al. |
| 2012/0153742 | A1 | 6/2012 | Lee et al. |
| 2012/0163492 | A1 | 6/2012 | Banin et al. |
| 2012/0293007 | A1 | 11/2012 | Byun et al. |
| 2012/0299389 | A1 | 11/2012 | Lee et al. |
| 2012/0300875 | A1 | 11/2012 | Kwon et al. |
| 2012/0306269 | A1 | 12/2012 | Kim et al. |
| 2013/0063083 | A1 | 3/2013 | Park et al. |
| 2013/0093257 | A1 | 4/2013 | Goto |
| 2013/0099734 | A1 | 4/2013 | Lee et al. |
| 2013/0127410 | A1 | 5/2013 | Park et al. |
| 2013/0147281 | A1 | 6/2013 | Kamata |
| 2013/0154557 | A1 | 6/2013 | Lee et al. |
| 2013/0181539 | A1 | 7/2013 | Muratov et al. |
| 2013/0183898 | A1 | 7/2013 | Strid |
| 2014/0225452 | A1 | 8/2014 | Kozaki et al. |
| 2016/0043563 | A1 | 2/2016 | Porat et al. |
| 2016/0049825 | A1 | 2/2016 | Green et al. |

FOREIGN PATENT DOCUMENTS

| | | |
|---|---|---|
| JP | 2007537688 | 12/2007 |
| JP | 2010104203 | 5/2010 |
| JP | 2010178473 | 8/2010 |
| JP | 2011019373 | 1/2011 |
| JP | 2013062895 | 4/2013 |
| JP | 5431033 | 3/2014 |
| KR | 20120132225 | 12/2012 |
| KR | 20120135084 | 12/2012 |
| WO | 2012015838 | 2/2012 |
| WO | 2013042570 | 3/2013 |

OTHER PUBLICATIONS

European Search Report for European Patent Application No. 13889567.7 dated Feb. 16, 2017, 7 pages.
Office Action for U.S. Appl. No. 14/780,009, dated May 4, 2017, 21 pages.
Office Action for Japanese Patent Application No. 2016-518314, dated Jan. 4, 2017, 6 pages (Including 3 pages of English translation).
Office Action for Korean Patent Application No. 2015-7035912, dated Jan. 12, 2017, 12 pages (Including 6 pages of English translation).
Office Action for Korean Patent Application No. 2015-7035940, dated Jan. 13, 2017, 21 pages (Including 12 pages of English translation).
Office Action for Japanese Patent Application No. 2016-521396, dated Jan. 4, 2017, 8 pages (Including 4 pages of English translation).
System Description Wireless Power Transfer Volume I: Low Power, Part 1: Interface Definition, Version 1.1.1, Jul. 2012, 247 pages.
International Search Report and Written Opinion for PCT/US2013/077904, dated Apr. 8, 2014, 10 pages.
International Preliminary Report on Patentability for PCT/US2013/077904, dated Jan. 28, 2016, 7 pages.
International Search Report and Written Opinion for PCT/US2013/077903, dated Apr. 8, 2014, 11 pages.
International Preliminary Report on Patentability for PCT/US2013/077903, dated Jan. 28, 2016, 8 pages.
Office Action for U.S. Appl. No. 14/780,009 dated Sep. 8, 2017, 17 pages.
Office Action for European Patent Application No. 13889567.7, dated Dec. 8, 2017, 4 pages.
Advisory Action for U.S. Appl. No. 141/80,009, dated Jan. 22, 2018, 22 pages.
Office Action for Korean Patent Application No. 2015-7035912, dated Jul. 26, 2017, 6 pages (Including 3 pages of English translation).
Office Action for Korean Patent Application No. 2015-7035912, dated Jan. 30, 2018, 6 pages (Including 3 pages of English translation).
Office Action for European Patent Application No. 13889634.5, dated Jan. 15, 2018, 5 pages.
Office Action for Korean Patent Application No. 2015-7035912, dated Apr. 5, 2018, 6 pages (Including 3 pages of nglish translation).

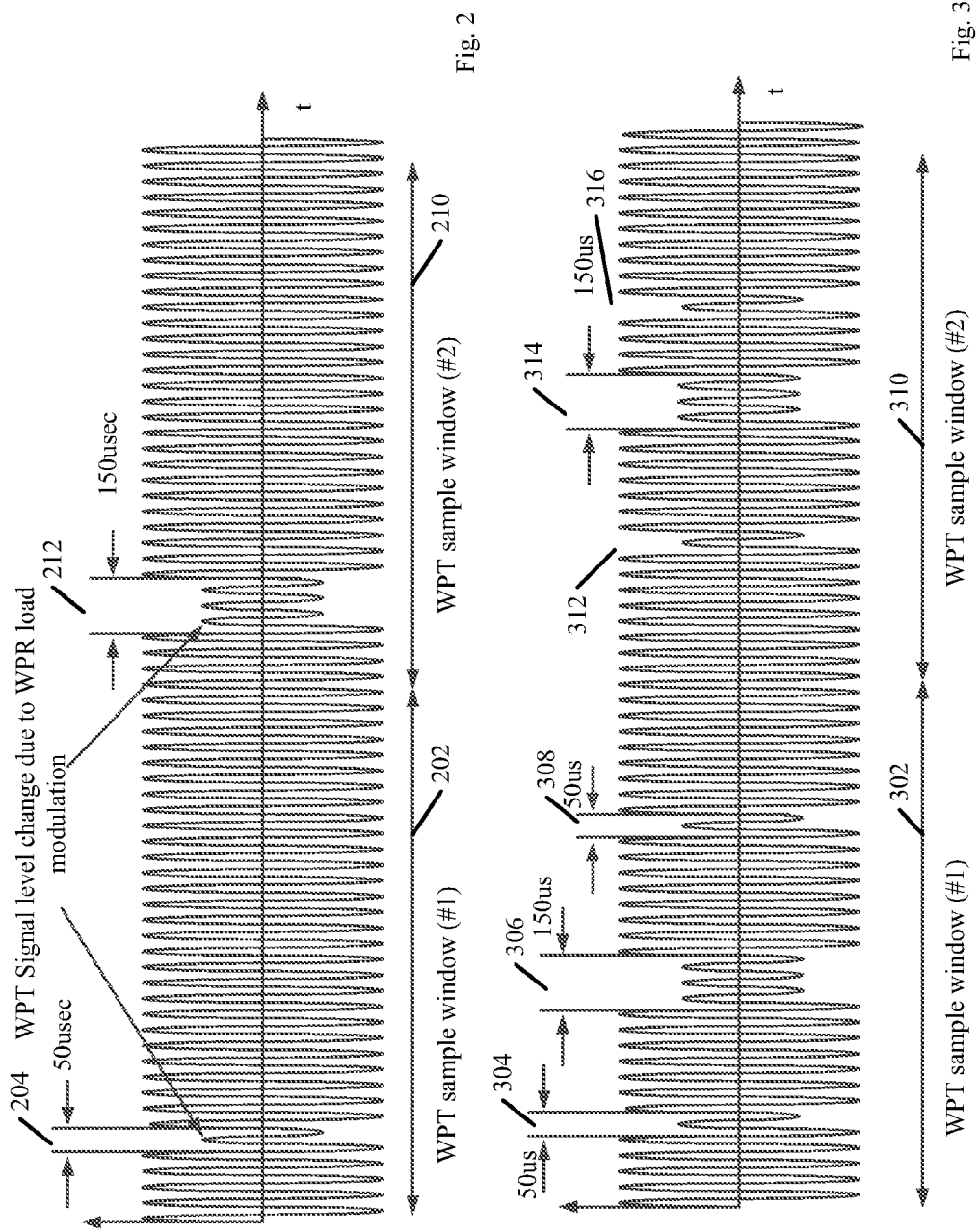

APPARATUS, SYSTEM AND METHOD OF MULTIPLE DEVICE WIRELESS POWER TRANSFER

CROSS REFERENCE

This application is a National Phase Application of PCT/US2013/077903, filed on Dec. 27, 2013, which claims the benefit of and priority from U.S. Provisional Patent Application No. 61/856,149 entitled "Multiple device wireless charging using load modulation", filed Jul. 19, 2013, the entire disclosures of which are incorporated herein by reference.

TECHNICAL FIELD

Some demonstrative embodiments relate to multiple device wireless power transfer.

BACKGROUND

Wireless technology continues to evolve, and with it so does the wide array of devices available in the marketplace. Further to emerging cellular handsets and Smartphones that have become integral to the lives of consumers, existing applications not traditionally equipped with any means to communicate are becoming wirelessly-enabled. For example, various industrial, commercial and/or residential systems may employ wireless communication for the purposes of monitoring, medical, reporting, control, etc.

As the application of wireless communication expands, the powering of wireless devices may become a concern. This concern falls mainly in the realm of mobile communication devices wherein the expanding applicability of wireless communication implies a corresponding increase in power consumption. One way, in which the power problem may be addressed is by increasing battery size and/or device efficiency. Development in both of these areas continues, but may be impeded by the desire to control wireless device size, cost, etc.

Another manner by which mobile wireless device power consumption may be addressed is by facilitating easier recharging of devices. In existing systems, battery-driven devices must be periodically coupled to another power source, e.g., grid power, solar power, fuel cell, and the like, for recharging. Typically this involves maintaining a recharger specific to the device being charged, and mechanically coupling the device to a charging cord for some period of time.

Developments in the area of recharging are being developed to replace this cumbersome process. For example, wireless charging may remove the requirement of having charging equipment corresponding to a particular device to be charged.

Wireless power transfer has the potential to transform electronics by "cutting the last cord," freeing users from the need to plug in to recharge devices, and changing the design space, for example, by enabling devices with no connectors.

One Wireless Charging Technology (WCT) approach is to enable a single wireless power transmitter (WPT) to simultaneously charge multiple wireless power receivers (WPR's).

However, in order to implement such an approach in a reliable and efficient manner, the WPT should have the capability to detect the number of WPR's that are currently located within a charging area of the WPT, and to distinguish the WPR's from other devices that might be located in the charging area but are not WPR's.

One solution is to use Bluetooth low energy (BLE) communication between the WPT and the WPR's. For example, each WPR could have a unique BLE name, and could continually use a BLE link to transmit data regarding the amount of power that it consumed.

However, the BLE communication may require establishing a communication link between the WPT and WPRs, which may increase power consumption, e.g., since the WPT may need to search for the WPRs, and/or may require a communication setup time to set up the BLE link.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 2 is a schematic illustration of a magnetic field of Wireless Power Transmitter (WPT) signal subject to load modulation by a single Wireless Power Receiver (WPR), in accordance with some demonstrative embodiments.

FIG. 3 is a schematic illustration of a magnetic field of a WPT signal subject to load modulation by three WPRs, in accordance with some demonstrative embodiments.

DETAILED DESCRIPTION

Figure 1:
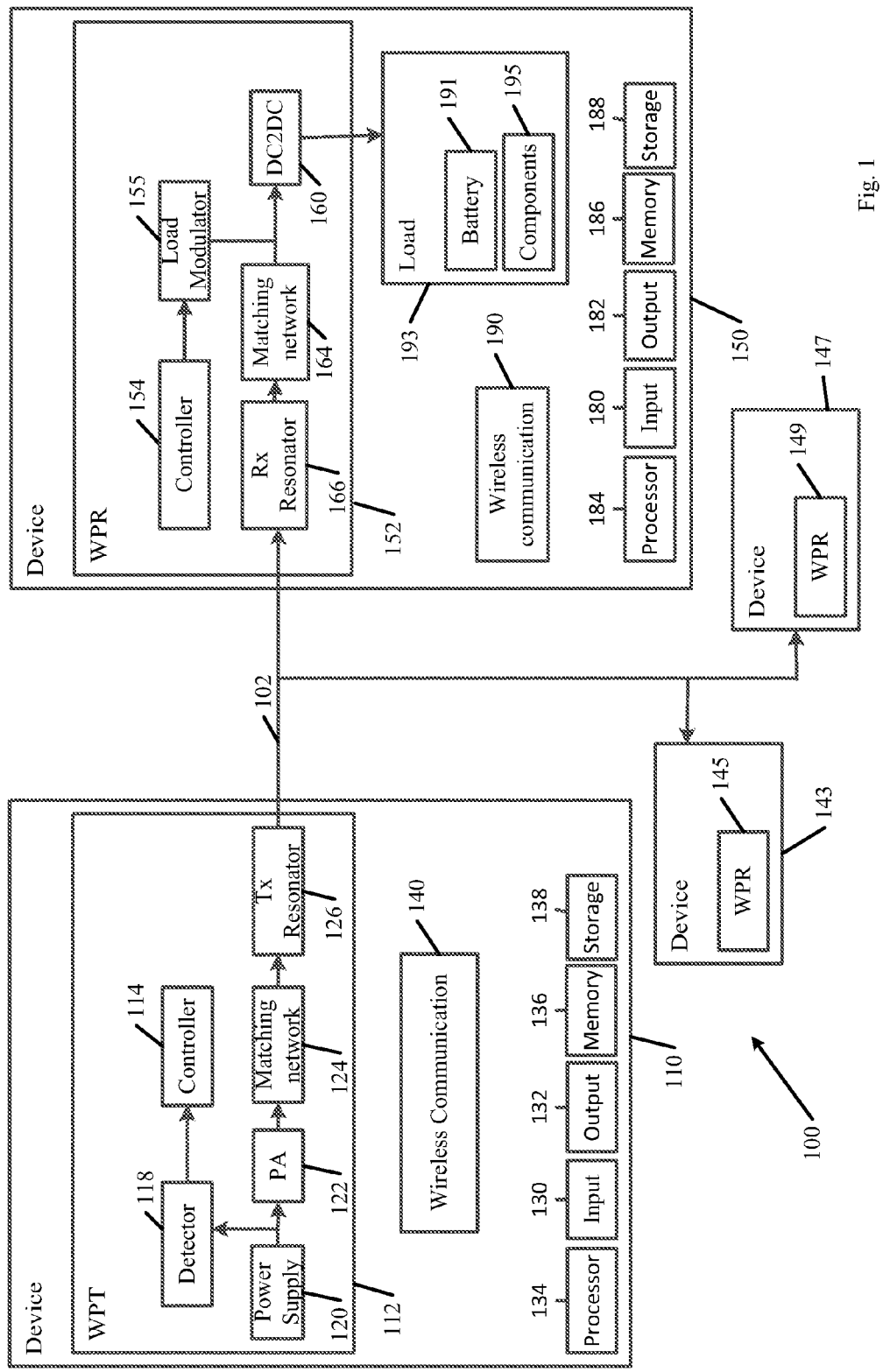
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a server computer, a handheld computer, a handheld device, a peripheral device, a Personal Digital Assistant (PDA) device, a handheld PDA device, a wireless charging device, an on-board device, an off-board device, a hybrid device, a vehicular device, a non-vehicular device, a mobile or portable device, a consumer device, a non-mobile or non-portable device, a wireless communication station, a wireless communication device, a video device, an audio device, an audio-video (A/V) device, a peripheral device, and the like.

Some embodiments may be used in conjunction with devices and/or systems operating in accordance with existing Alliance for Wireless Power (A4WP) Specifications (*A4WP Wireless Power Transfer System Baseline System Specification (BSS) Proposal* Version 1.0.4, Mar. 6, 2013) and/or future versions and/or derivatives thereof, devices and/or systems operating in accordance with existing Wireless Power Consortium (WPC) Specifications (including "*System Description, Wireless Power Transfer, Volume I: Low Power*, Part 1: Interface Definition, Version 1.1.1, July 2012") and/or future versions and/or derivatives thereof, devices and/or networks operating in accordance with wireless charging Specifications, wireless transfer Specifications, units and/or devices which are part of the above systems, and the like.

The phrase "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The phrase "wireless power signal", as used herein, includes, for example, a transmission of electric power from a first device (also referred to as "power transmitter", "Wireless Power Transmitter (WPT)" or "Power Transmitter Unit (PTU)") to at least one second device (also referred to as "power receiver", "Wireless Power Receiver (WPR)" or "Power Receiver Unit (PRU)"), via a wireless medium, e.g., without using an electric cable or wire to transfer the electric power between the power transmitter and power receiver. In one example, the wireless power signal may be in the form of a magnetic field, which may configured to induce electric current at the power receiver. Alternatively, the wireless power signal may include any other form of transferring power from the power transmitter to the power receiver.

Reference is now made to FIG. 1, which schematically illustrates a system 100, in accordance with some demonstrative embodiments.

As shown in FIG. 1, in some demonstrative embodiments, system 100 may include at least one device 110 ("charging device") configured to transmit at least one wireless power signal 102 to be received by a plurality of devices, for example, including device 150, device 143 and/or device 147, e.g., to charge devices 150, 143 and/or 147, as described below.

In some demonstrative embodiments, device 110 may transmit wireless power signal 102, for example, to charge two or more of the plurality of devices 150, 143 and/or 147, e.g., simultaneously.

Although in some embodiments, as shown in FIG. 1, device 110 may transmit wireless power signal 102 to a plurality of devices, in other embodiments, device 110 may transmit at least one wireless power signal 102 to be received by a single device.

In some demonstrative embodiments, device 110 may include a Wireless Power Transmitter (WPT) 112 configured to transmit wireless power signal 102, device 150 may include a Wireless Power Receiver (WPR) 152, device 143 may include a WPR 145 and/or device 147 may include a WPR 149, configured to receive wireless power signal 102.

In some demonstrative embodiments, WPR 152 may be configured to provide power to at least one device load 193 of device 150, WPR 145 may be configured to provide power to at least one device load of device 143 and/or WPR 149 may be configured to provide power to at least one device load of device 147.

In some demonstrative embodiments, device 150, device 143 and/or device 147 may be a battery-powered device.

In one example, load 193 may include a battery 191 of device 150. For example, WPR 152 may be configured to provide power to charge battery 191.

For example, device 150, device 143 and/or device 147 may include a mobile phone, a Smartphone, a watch, a mobile computer, a laptop computer, a tablet computer, an Ultrabook™ computer, a notebook computer, a video device, a display device, a handheld computer, a handheld device, a PDA device, a handheld PDA device, a hybrid device (e.g., combining cellular phone functionalities with PDA device functionalities), a consumer device, a vehicular device, a non-vehicular device, a mobile or portable device, a cellular telephone, a Personal Communication Systems (PCS) device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, an audio device, an A/V device, a Personal Media Player (PMP), a digital video camera (DVC), a digital audio player, a Digital Still camera (DSC), a media player, a music player, or the like.

In other embodiments, device 150, device 143 and/or device 147 may include a device, e.g., a peripheral device, which may be configured to directly consume the power received from device 110.

In one example, load 193 may include one or more components 195 of device 150, which may be configured to utilize the power provided by WPR 152. For example, WPR 152 may be configured to provide power to be consumed by the one or more components 195.

For example, device 150, device 143 and/or device 147 may include a wireless mouse, a wireless keyboard, a wireless storage device, a wireless sensor device, a wireless audio device, a wireless speaker device, a wireless microphone, a wireless joystick, a trackball, a remote control, and the like.

In some demonstrative embodiments, device 110 may include a non-mobile device, for example, a Personal Computer (PC), a desktop computer, a dedicated charger device, a vehicular device, a car charger, an on-board device, an off-board device, a consumer device, a video device, an audio device, an A/V device, or the like.

In other embodiments, device 110 may include a mobile device, for example, a mobile charger, a charger pad, a charger plate, a charger board, a charger cover, a charger mat, a charging case, a charging sleeve, a mobile phone, a Smartphone, a watch, a mobile computer, a laptop computer, a tablet computer, an Ultrabook™ computer, a notebook computer, a video device, a display device, a handheld computer, a handheld device, a PDA device, a handheld PDA device, a hybrid device (e.g., combining cellular phone functionalities with PDA device functionalities), a consumer device, a vehicular device, a non-vehicular device, a mobile or portable device, a cellular telephone, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, an audio device, an A/V device, a Personal Media Player (PMP), a digital video camera (DVC), a digital audio player, a Digital Still camera (DSC), a media player, a music player, or the like.

In one example, device 110 may include a first mobile device, for example, a mobile computer, e.g., an Ultrabook™ computer, a laptop computer or a notebook computer, and device 150, device 143 and/or device 147 may include at least one second mobile device, e.g., a mobile phone, another mobile computer, and the like.

In another example, device 110 may include a mobile computer, e.g., an Ultrabook™ computer, a laptop computer or a notebook computer, and device 150, device 143 and/or device 147 may include a peripheral of the mobile computer, e.g., a wireless keyboard, a wireless mouse, a wireless microphone, a wireless speaker, a wireless joystick, and the like.

In another example, device 110 may include a stationary device, e.g., PC or a desktop computer, and device 150, device 143 and/or device 147 may include a peripheral of the stationary device, e.g., a wireless keyboard, a wireless mouse, a wireless microphone, a wireless speaker, a wireless joystick, and the like; or a mobile device to be charged by the stationary device, e.g., a mobile phone, a mobile computer, and the like.

In other embodiments, devices 110, 150, 143 and/or 147 may include any other combination of mobile or non-mobile devices.

In some demonstrative embodiments, WPT 112 may be configured to transmit power via power signal 102, for example, upon detecting an object, e.g., device 150, device 143 and/or device 147, is within a predefined area ("the charging area") in proximity to or in contact with device 110, e.g., such that wireless power signal 102 may be effectively received by WPR 152, WPR 145 and/or WPR 149.

In some demonstrative embodiments, WPR 152 may receive wireless power signal 102 and may charge battery 191 of device 150 and/or provide power to operate one or more components 195 of device 150; WPR 145 may receive wireless power signal 102 and may provide power to a load of device 143; and/or WPR 149 may receive wireless power signal 102 and may provide power to a load of device 147.

In some demonstrative embodiments, WPT 112 may include a Power Amplifier (PA) 122 to amplify power received from a power supply 120.

In one example, power supply 120 may include an internal power supply of device 110, e.g., a battery of device 110.

In another example, power supply 120 may include a wall adapter and/or a converter, e.g., a Direct Current (DC) to DC (DC2DC) converter or an Alternating Current AC to DC (AC2DC) converter to convert electric power received from an external power source, e.g., via a power cord or cable.

In some demonstrative embodiments, WPT 112 may include a Transmitter (Tx) resonator 126 configured to convert the electric power from PA 122 into wireless charging signal 102, e.g., in the form of a Radio Frequency (RF) signal. For example, Tx resonator 126 may include a magnetic field generator capable of generating charging signal 102 in response to the power provided by PA 122. In one example, Tx resonator 126 may include a coil or an electrical conducting wire.

In some demonstrative embodiments, WPT 112 may include a matching network 124 to match an electric impedance between PA 122 and TX resonator 126, e.g., to maximize a power transfer between PA 122 and Tx resonator 126 and/or to minimize reflections from Tx resonator 126.

In some demonstrative embodiments, WPR 152, WPR 145 and/or WPR 149 may include a Receiver (Rx) resonator 166 configured to convert wireless charging signal 102 into a power signal. For example, Rx resonator 166 may include a coil.

In some demonstrative embodiments, WPR 152 may include a DC2DC converter to convert the power signal received by Rx resonator 166 into a power signal suitable for load 193, e.g., to charge battery 191 and/or to power one or more components 195 of device 150.

In some demonstrative embodiments, WPR 152 may include a matching network 164 to match the electrical impedance between RX resonator 166 and load 193, e.g., to maximize a power transfer between Rx resonator 166 and load 193 and/or to minimize reflections from load 193. WPR 152 may also include a rectifier (not shown) to convert the power signal from matching network 164 into a DC signal.

In some demonstrative embodiments, WPT 112 may include a wireless power controller ("controller") 114 to control one or more operations of WPT 112, for example, by controlling current provided to Tx resonator 126 to generate wireless power signal 102, e.g., as described below.

In some demonstrative embodiments, WPR 152 may include a wireless power controller ("controller") 154 to control one or more operations of WPR 152, for example, to communicate with WPT 112, e.g., as described below.

In some demonstrative embodiments, WPR 145 and/or WPR 149 may be configured to perform the functionality of a WPR to provide electric power to a load of devices 143 and/or 147, e.g., in a manner similar to the functionality of WPR 152.

In some demonstrative embodiments, device 110 may also include, for example, one or more of a processor 134, an input unit 130, an output unit 132, a memory unit 136, a storage unit 138, and/or a wireless communication module 140. Devices 150, 143 and/or 147 may also include, for example, one or more of a processor 184, an input unit 180, an output unit 182, a memory unit 186, a storage unit 188, and/or s wireless communication module 190. Devices 110 and/or 150 may optionally include other suitable hardware components and/or software components. In some demonstrative embodiments, some or all of the components of device 110 and/or device 150 may be enclosed in a common housing or packaging, and may be interconnected or operably associated using one or more wired or wireless links. In other embodiments, components devices 110 and/or 150 may be distributed among multiple or separate devices.

Processor 134 and/or processor 184 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 134 may execute instructions, for example, of an Operating System (OS) of device 110 and/or of one or more suitable applications; and/or processor 184 may execute instructions, for example, of an OS of device 150 and/or of one or more suitable applications.

Input unit 130 and/or input unit 180 includes, for example, a keyboard, a keypad, a mouse, a touch-screen, a touch-pad, a track-ball, a stylus, a microphone, or other suitable pointing device or input device. Output unit 132 and/or output unit 182 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 136 and/or memory unit 186 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 138 and/or storage unit 188 includes, for example, a hard disk drive, a floppy disk drive, a Compact Disk (CD) drive, a CD-ROM drive, a DVD drive, or other suitable removable or non-removable storage units. Memory unit 136 and/or storage unit 138, for example, may store data processed by device 110; and/or memory unit 186 and/or storage unit 188, for example, may store data processed by device 150.

In some demonstrative embodiments, wireless communication modules 140 and/or 190 may include one or more radios, e.g., including one or more wireless transmitters, receivers and/or transceivers able to send and/or receive wireless communication signals, IR signals, Bluetooth signals, RF signals, frames, blocks, transmission streams, packets, messages, data items, and/or data. For example, wireless communication modules 140 and/or 190 may include or may be implemented as part of a wireless Network Interface Card (NIC), and the like.

In some demonstrative embodiments, WPT 112 may be configured to detect when a WPR is located within the charging area of WPT 112, e.g., as described below.

In some demonstrative embodiments, WPT 112 may be configured to distinguish between a WPR located within the charging area of WPT 112 and other objects or devices ("non-WPR objects"), which may be located within the charging area of WPT 112, e.g., as described below.

In some demonstrative embodiments, WPT 112 may be configured to detect a number of WPRs, which are located in the charging area of WPT 112, e.g., as described below.

In some demonstrative embodiments, WPT 112 may be configured to detect an amount of power to be provided to one or more WPRs within the charging area of WPT 112, e.g., as described below.

In some demonstrative embodiments, detecting when a WPR is located within the charging area of WPT 112, distinguishing between WPRs and non-WPR objects located within the charging area of WPT 112, detecting the number of WPRs within the charging area of WPT 112 and/or detecting the amount of power to be provided to one or more WPRs within the charging area of WPT 112 may enable WPT 112 to manage power transfer via wireless power signal 102 in an efficient and/or reliable manner.

For example, detecting when a WPR is located within the charging area of WPT 112, distinguishing between WPRs and non-WPR objects located within the charging area of WPT 112, detecting the number of WPRs within the charging area of WPT 112 and/or detecting the amount of power to be provided to one or more WPRs within the charging area of WPT 112 may enable WPT 112 to determine a total amount of power to be transferred via wireless power signal 102.

In some demonstrative embodiments, WPT 112 may operate at a reduced power mode, during which WPT 112 may attempt to detect at least one WPR in the charging area of WPT 112. For example, WPT 112 may generate wireless power signal 102 at a reduced power, e.g., to enable detecting one or more WPRs in the charging area of WPT 112, e.g., as described below.

In some demonstrative embodiments, WPT 112 may determine an amount of power to be transferred via wireless power signal 102 based on the number of detected WPRs within the charging area of WPT 112 and based on the amount of power to be transferred to each of the detected WPRs, e.g., as described below.

In some demonstrative embodiments, distinguishing between WPRs and non-WPR devices may enable WPT 112 to provide power to wireless power signal 102 based on actual power requirements of the actual WPRs, for example, while avoiding to provide to wireless power signal 102 power which may be "wasted" on the non-WPR objects.

In some demonstrative embodiments, it may not be efficient to use a wireless communication link, e.g., an Infra-Red (IR) link, a Bluetooth link, a Bluetooth low energy (BLE) link, or any other wireless communication link, to enable WPT 112 to detect WPR 152 and/or to communicate between WPR 152 and WPT 112 information regarding the amount of power that it consumed by WPR 152.

For example, such a solution may not be efficient, since it may require establishing a communication link between WPT 112 and WPRs 152, 145 and/or 149, which may increase power consumption of WPT 112, e.g., since WPT 112 may be required to search for wireless communication signals from the WPRs, and/or since establishing a communication link between WPT 112 and WPRs 152, 145 and/or 149 may require a communication setup time to set up the link.

In some demonstrative embodiments, WPT 112 may be configured to sense when device 150, device 143 and/or device 147 is physically placed within the charging area of WPT 112, for example, by detecting changes in the load on wireless charging signal 102, e.g., as described in detail below.

In some demonstrative embodiments, WPT 112 may detect when WPR 152, WPR 145 and/or WPR 149 is in charging area of WPT 112, for example, based on a change in a load on Tx resonator 126, e.g., as described below.

In some demonstrative embodiments, it may not be efficient to use a plurality of Tx resonators 126, e.g., such that each Tx resonator may be dedicated to a single respective WPR, to detect the presence of a plurality of WPRs. For example, such a solution may require a relatively complex implementation of Tx resonators 126 and/or of WPT 112.

In some demonstrative embodiments, WPR 152, WPR 145 and/or WPR 149 may be configured to modulate a load of wireless power signal 102, e.g., as described bellow.

In some demonstrative embodiments, WPR 152, WPR 145 and/or WPR 149 may include a load modulator 155 to controllably modulate the load on wireless power signal 102. For example, controller 154 may control load modulator 155 to modulate the load on wireless signal 102, e.g., by increasing or decreasing a load ("modulation load"), which may be applied, e.g., in addition to the actual load of load 193.

In some demonstrative embodiments, controller 154 may control load modulator 155 to generate an increased load on wireless power signal 102, for example, upon detecting wireless power signal 102.

In some demonstrative embodiments, the increased load on wireless power signal 102 may induce, for example, a change, e.g., a decrease, in a magnetic field of wireless power signal 102.

In some demonstrative embodiments, controller 154 may control load modulator 155 to modulate the load on wireless power signal 102 for a duration, which may be based on a requested amount of power by WPR 152.

For example, controller 154 may control load modulator 155 to modulate the load on wireless power signal 102 for first duration representing a first requested amount of power for WPR 152. Controller 154 may control load modulator 155 to modulate the load on wireless power signal 102 for a second duration representing a second requested amount of power of WPR 152. For example, the second duration may be longer than the first duration, for example, if the second requested amount of power is greater than the first requested amount of power.

In some demonstrative embodiments, controller 154 may control load modulator 154 to modulate the load on wireless power signal 102 according to a time-division modulation scheme, e.g., as described below.

In some demonstrative embodiments, the time-division modulation scheme may be configured to enable a plurality of WPRs, e.g., WPR 152, WPR 145 and/or WPR 149, to modulate the load on wireless power signal 102 in a non-overlapping manner, e.g., during different time slots.

For example, WPR 152 may modulate wireless power signal 102 during a first time slot for a first duration representing a first requested power by WPR 152, WPR 145 may modulate wireless power signal 102 during a second time slot, different from the first time slot, for a second duration representing a second requested power by WPR 145, and/or WPR 149 may modulate wireless power signal 102 during a third time slot, different from the first and second time slots, for a third duration representing a third requested power by WPR 149.

In some demonstrative embodiments, WPRs 152, 145 and/or 149 may be configured to select the time slots based on a back-off mechanism, which may be configured to enable the selection of non-overlapping time slots, e.g., as described below. In other embodiments, any other mechanism may be utilized.

In some demonstrative embodiments, controller 154 may select a delay period, and may wait the delay period between detection of wireless power signal 102 and between beginning the time slot for modulation of the load on wireless power signal 102.

In some demonstrative embodiments, controller 154 may select the delay period from a predefined range of delay periods, e.g., as described below.

In some demonstrative embodiments, controller 154 may randomly select the delay period, e.g., as described below.

In some demonstrative embodiments, the duration of the load modulation performed by WPR 152 may be lesser than a shortest delay period of the range of delay periods, e.g., in order to ensure that the duration of the load modulation performed by WPR 152 may not overlap with a load modulation performed by another WPR.

In some demonstrative embodiments, WPT 112 may detect one or more load modulation events within a predefined time interval ("sample window") based on a change in the load on wireless power signal 102, e.g., as described below.

In some demonstrative embodiments, the sample window may be configured to enable WPT 112 to detect the load modulations performed by the plurality of WPRs, e.g., as described below.

In some demonstrative embodiments, WPT 112 may transmit wireless power signal 102 by generating a magnetic field. For example, controller 114 may control the power provided to Tx resonator 126, such that Tx resonator 126 may induce a magnetic field within the charging area of WPT 112, e.g., as described above.

In some demonstrative embodiments, WPT 112 may detect a load modulation event by detecting a change, e.g., a decrease, in the level of the magnetic field of wireless power signal 102.

In some demonstrative embodiments, WPT 112 may detect the modulation events based on a change in a load on Tx resonator 126, e.g., as described below. In other embodiments, WPT 112 may detect the load modulation events by detecting any other affect resulting from the change of the load of wireless power signal 102.

In some demonstrative embodiments, WPT 112 may include a detector 118 to detect the change in a load on Tx resonator 126.

In some demonstrative embodiments, detector 118 may be configured to detect a voltage on Tx resonator 126 and/or a current through Tx resonator 126. For example, controller 114 may detect the load modulation events based on a decrease of the voltage on Tx resonator 126 and/or an increase of the current through Tx resonator 126.

In some demonstrative embodiments, detector 118 may be configured to detect changes in the current flow in power amplifier 122 during transmission of wireless power signal 102.

In some demonstrative embodiments, detector 118 may include a peak detector configured to detect one or more peaks of the current flow in power amplifier 122.

In some demonstrative embodiments, controller 114 may detect the load modulation events based on the one or more peaks detected by detector 118.

In some demonstrative embodiments, detector 118 may include any other detector to detect the induced load on WPT 112. For example, detector 118 may be configured to measure reflected power and/or changes in voltage across Tx resonator 126 during transmission of wireless power signal 102. In other embodiments, any other detection technique may be utilized to detect the induced load on WPT 112.

In some demonstrative embodiments, controller 114 may determine the number of WPRs within the charging area of WPT 112, for example, by counting the number of load modulation events within the sample window.

For example, the number of WPRs within the charging area of WPT 112 may be equal to the number of load modulation events within the sample window, e.g., if each WPR may generate only a single load modulation event per sample window.

In some demonstrative embodiments, WPT 112 may determine an amount of power to be provided to the plurality of detected WPRs, e.g., WPRs 152, 145 and/or 149, based on the load modulation events, e.g., as described below.

In some demonstrative embodiments, controller 114 may determine the amount of power to be provided to WPRs 152, 145 and/or 149, for example, based on a number of the detected load modulation events, and the durations of the detected load modulation events, e.g., as described below.

In some demonstrative embodiments, controller 114 may determine the amount of power to be provided to WPRs 152, 145 and/or 149, for example, based on a sum of the durations of the detected load modulation events.

For example, controller 114 may determine the total amount of power to be provided to WPRs 152, 145 and 149 by summing the first duration of the first load modulation event generated by WPR 152, the second duration of the second load modulation event generated by WPR 145, and the third duration of the third load modulation event generated by WPR 149.

In some demonstrative embodiments, controller 114 may control WPT 112 to dynamically adjust wireless power signal 102 based on the determined amount of power to be provided to the plurality of WPRs. For example, controller 114 may control WPT 112 to increase the power of wireless power signal 102, e.g., responsive to an increase in the determined total amount of power, or to decrease the power of wireless power signal 102, e.g., responsive to a decrease in the determined total amount of power.

In some demonstrative embodiments, controller 114 may determine the presence of at least one non-WPR object within the charging area of WPT 112.

For example, the determined total amount of power, as determined by WPT 112, may indicate an actual power requirement of the plurality of WPRs. Accordingly, a difference between the determined total amount of power, as determined by WPT 112, and an actual power provided by wireless power signal 102 may indicate the presence of one or more non-WPR objects within the charging area of WPT 112.

In some demonstrative embodiments, controller 114 may determine the presence of at least one non-WPR object, if the determined total amount of power, e.g., as determined based on the load modulation events, is lesser than an actual power delivered by wireless power signal 102.

In some demonstrative embodiments, controller 114 may control WPT 112 to stop transmitting wireless power signal 102, for example, when the determined amount of power to be provided to the plurality of WPRs is lesser than the actual power delivered by wireless power signal 102.

In some demonstrative embodiments, controller 114 may repeatedly detect the load modulation events during a plurality of consecutive sample windows, e.g., as described below.

In some demonstrative embodiments, a duration of the sample window and/or the time slots utilized by the WPRs for the load modulation may be configured to enable WPT 112 to detect no more than one load modulation event corresponding to each of the WPRs during each sample window, e.g., as described below.

In some demonstrative embodiments, controller 114 may determine the total amount of power required by the plurality of WPRs based on the load modulation events detected during a sample window. Controller 114 may control WPT 112 to adjust the power of wireless power signal 102 based on the determined total amount of power required by the plurality of WPRs.

In some demonstrative embodiments, controller 114 may determine an updated total amount of power required by the plurality of WPRs based on the load modulation events detected during a consecutive sample window. Controller 114 may control WPT 112 to adjust the power of wireless power signal 102 based on the updated total amount of power required by the plurality of WPRs.

In some demonstrative embodiments, controller 114 may repeat determining the updated total amount of power required by the plurality of WPRs based on the load modulation events detected during additional sample windows. Accordingly, controller 114 may control WPT 112 to dynamically adjust the power of wireless power signal 102 during the additional sample windows.

Reference is made to FIG. 2, which schematically illustrates a magnetic field of a WPT wireless power signal subject to load modulation by a single WPR, in accordance with some demonstrative embodiments.

For example, the magnetic filed of the wireless power signal of FIG. 2 may include the magnetic field of wireless power signal 102 (FIG. 1) generated by WPT 112 (FIG. 1) subject to load modulation by WPR 152 (FIG. 1). According to this example, controller 154 (FIG. 1) may control load modulator 155 (FIG. 1) to apply a modulation load to wireless power signal 102 (FIG. 1), e.g., to indicate required power by device 150 (FIG. 1).

In some demonstrative embodiments, detector 118 (FIG. 1) may detect changes in the magnetic level of wireless power signal 102 (FIG. 1), e.g., as shown in FIG. 2.

As shown in FIG. 2, a single load modulation event 204 may be detected during a first WPT sample window 202, and a single load modulation event 212 may be detected during a second WPT sample window 210, e.g., subsequent to WPT sample window 210.

As shown in FIG. 2, modulation events 204 and 212 may be detected by detecting an indication of a change, e.g., a decrease, in the magnetic field of wireless power signal 102 (FIG. 1).

As shown in FIG. 2, modulation event 204 may have a duration of 50 microseconds (us), and modulation event 212 may have a duration of 150 us.

In some demonstrative embodiments, controller 114 (FIG. 1) may determine that there is a single WPR within the charging area of WPT 112 (FIG. 1) during the sample windows 202 and 210, e.g., since only a single load modulation event is detected in each of the sample windows 202 and 210.

In some demonstrative embodiments, controller 114 (FIG. 1) may determine a first power level required by WPR 152 (FIG. 1) during sample window 202, e.g., based on the duration of load modulation event 204; and a second power level required by WPR 152 (FIG. 1) during sample window 210, e.g., based on the duration of load modulation event 212.

In some demonstrative embodiments, a relationship may be defined between the duration of a load modulation event and a required power to be indicated by the load modulation event.

In one example, a linear relationship may be defined between the duration of a load modulation event and a required power to be indicated by the load modulation event.

For example, the required power to be indicated by the load modulation event may be a multiple of the duration of a load modulation event. According to this example, the second power level may be three times the first power level, e.g., since load modulation event 212 is three times longer than load modulation event 204.

In other embodiments, any other linear or non-linear relationship may be defined between the duration of a load modulation event and a required power to be indicated by the load modulation event.

Reference is made to FIG. 3, which schematically illustrates a magnetic field of a WPT wireless power signal subject to load modulation by three WPRs, in accordance with some demonstrative embodiments.

For example, the magnetic filed of the wireless power signal of FIG. 3 may include the magnetic field of wireless power signal 102 (FIG. 1) generated by WPT 112 (FIG. 1) subject to load modulation by WPR 152 (FIG. 1), WPR 145 (FIG. 1) and WPR 149 (FIG. 1). According to this example, WPRs 152, 145 and 149 (FIG. 1) may apply a modulation load to wireless power signal 102 (FIG. 1), for example, during different time slots, e.g., to indicate required power by WPRs 152 (FIG. 1), 145 and 149 (FIG. 1).

In some demonstrative embodiments, detector 118 (FIG. 1) may detect changes in the magnetic level of wireless power signal 102 (FIG. 1), e.g., as shown in FIG. 3.

As shown in FIG. 3, WPT 112 (FIG. 1) may detect a first load modulation event 304, a second load modulation event 306 and a third load modulation event 308 during a first WPT sample window 302.

As also shown in FIG. 3, WPT 112 (FIG. 1) may detect a first load modulation event 312, a second load modulation event 314 and a third load modulation event 316 during a second WPT sample window 310, e.g., subsequent to sample window 302.

As shown in FIG. 3, modulation events 304, 306, 308, 312, 314 and 316 may be detected by detecting an indication of a change, e.g., a decrease, in the magnetic field of wireless power signal 102 (FIG. 1).

As shown in FIG. 3, modulation event 304 may have a duration of 50 us, modulation event 306 may have a duration of 150 us, and modulation event 308 may have a duration of 50 us.

In some demonstrative embodiments, controller 114 (FIG. 1) may determine the presence of three WPRs within the charging area of WPT 112 (FIG. 1) during the sample window 302, e.g., since three load modulation events are detected in sample window 302.

In some demonstrative embodiments, controller 114 (FIG. 1) may determine a total power level required by WPRs 152, 145 and 149 (FIG. 1) during sample window 302, e.g., based on the durations of load modulation events 304, 306 and 308.

For example, controller 114 (FIG. 1) may determine a total power level required by WPRs 152, 145 and 149 (FIG. 1) during sample window 302 based on a sum of the durations of load modulation events 304, 306 and 308.

As shown in FIG. 3, modulation event 312 may have a duration of 50 us, modulation event 314 may have a duration of 150 us, and modulation event 316 may have a duration of 50 us.

In some demonstrative embodiments, controller 114 (FIG. 1) may determine the presence of three WPRs within the charging area of WPT 112 (FIG. 1) during the sample window 310, e.g., since three load modulation events are detected in sample window 310.

In some demonstrative embodiments, controller 114 (FIG. 1) may determine a total power level required by WPRs 152, 145 and 149 (FIG. 1) during sample window 310, e.g., based on the durations of load modulation events 312, 314 and 316.

For example, controller 114 (FIG. 1) may determine a total power level required by WPRs 152, 145 and 149 (FIG. 1) during sample window 310 based on a sum of the durations of load modulation events 312, 314 and 316.

For example, controller 114 (FIG. 1) may determine that the total power level required by WPRs 152, 145 and 149 (FIG. 1) may remain unchanged between sample windows 302 and 310, e.g., since the durations of load modulation events 312, 314 and 316 are the same as the durations of load modulation events 304, 306 and 308, respectively.

In some demonstrative embodiments, controller 114 (FIG. 1) may determine the presence of a non-WPR object in the charging area of WPT 112 (FIG. 1), for example, if an actual power level of wireless power signal 102 (FIG. 1) increases between sample windows 302 and 310, e.g., while the determined total power level remains unchanged.

Referring back to FIG. 1, following is a description of operations performed by WPT 112 and WPR 152 according to a demonstrative time-division modulation scheme, in accordance with some demonstrative embodiments. In other embodiments, any other load modulation scheme may be used.

In some demonstrative embodiments, WPT 112 may generate a magnetic field. For example, controller 114 (FIG. 1) may control Tx resonator 126 to transmit signal 102 at a power level sufficient for one or more WPRs within the charging area of WPT 112 to receive signal 102, e.g., as described above.

In some demonstrative embodiments, WPT 112 may continuously attempt to detect one or more load modulation events on signal 102 during the sample window. For example, controller 114 may attempt to detect load modulation events during the sample window by detecting changes in the load on signal 102, e.g., as described above.

In some demonstrative embodiments, a WPR, e.g., WPR 152 may move within the charging area of WPT 112, and may detect signal 102. For example, controller 154 may detect a current flowing through Rx resonator 166, e.g., responsive to the magnetic field of signal 102.

In some demonstrative embodiments, controller 154 may randomly select a number within a predefined range of delay values. For example, controller 154 may randomly select a number within the range of integer numbers between 0 and 99, or any other range.

In some demonstrative embodiments, controller 154 may calculate a delay time until beginning load modulation on signal 102 based on the selected delay value.

In one example, controller 154 may calculate the delay time, denoted t_delay, e.g., as follows:

$$t\_delay = (RND0\_99 * WPT\_Sample\_Window)/100 \quad (1)$$

wherein RND0_99 denotes an integer value randomly selected between the values 0 and 99; and wherein WPT_Sample_Window denotes a duration, e.g., in microseconds (ms), of the sample window of WPT 112.

In other embodiments, the delay time may be determined according to any other function and/or calculation.

In some demonstrative embodiments, controller 154 may wait for the determined delay time t_delay, e.g., between detecting signal 102 and beginning load modulation on signal 102.

In some demonstrative embodiments, determining the delay time t_delay based on the randomly selected value RND0_99 may enable a plurality of WPRs to back off the load modulation in a random manner, e.g., to reduce the probability that two WPRs will apply load modulation to signal 102 during overlapping time slots.

In some demonstrative embodiments, controller 154 may determine duration of a load modulation event to be applied to signal 102, for example, based on a required power by WPR 152, e.g., as described above.

In some demonstrative embodiments, the duration of the load modulation event may be shorter than a shortest duration of the delay time t_delay, e.g., in order to ensure that the load modulation event may not overlap with another time slot.

In one example, the duration, denoted $t_{ldmod\_width}$, of the load modulation event may be set to comply with the following criterion:

$$t_{ldmod\_width} < (WPT\_Sample\_Window)/100 \quad (2)$$

In one example, the duration of the load modulation event may be determined, e.g., as follows:

$$t_{ldmod\_width} = [(WPT\_Sample\_Window)/100]*(1+i) \quad (3)$$

wherein:

$$i = integer[(Receiver\_Power)/10] \quad (4)$$

wherein Receiver_Power denotes a required power, e.g., in Watt (W), by WPR 152 to be received from WPT 112.

In some demonstrative embodiments, the sample window may have a duration of WPT_Sample_Window=250 ms. Accordingly, the duration $t_{ldmod\_width}$ may be between 25 us and about 500 us.

In other embodiments, the duration of the load modulation event may be determined according to any other calculation and/or criterion.

In some demonstrative embodiments, controller 154 may control load modulator 155 to modulate signal 102 according to the determined duration $t_{ldmod\_width}$, e.g., as described above.

In some demonstrative embodiments, controller 154 may control load modulator 155 to repeat the load modulation on signal 102 at an interval, which may be configured to ensure that a single load modulation event is generated by WPR 152 per sample window.

In one example, controller 154 may control load modulator 155 to repeat the load modulation on signal 102 at a sequence of times, denoted t, which may be determined, e.g., as follows:

$$t = t\_delay + i*WPT\_Sample\_Window \quad (5)$$

wherein i=1, 2, 3, 4 . . . .

In some demonstrative embodiments, WPT 112 may monitor the number of load modulation events detected during a sample window to identify the number of WPRs within the charging area of WPT 112, e.g., as described above.

In some demonstrative embodiments, controller 114 may determine the total amount of requested power based on the detected load modulation events, e.g., as described above.

In some demonstrative embodiments, controller 114 may indicate to the WPRs within the charging area of WPT 112 that the time-division modulation scheme is to be reset.

For example, controller 114 may determine that at least a pair of WPRs is performing load modulation during overlapping time slots.

In some demonstrative embodiments, controller 114 may reset the magnetic field generated by signal 102, e.g., by turning the power to signal 102 off and on. As a result, controller 154 may be triggered to reselect the delay t_delay.

In some demonstrative embodiments, controller 114 may detect the presence of a non-WPR within the charging area of WPT 112, for example, if an amount of power actually consumed by wireless power signal 102 is greater than the determined total amount of requested power by the WPRs.

In some demonstrative embodiments, controller 114 may control WPT 112 to stop the power transfer, e.g., by stopping to transmit signal 102, for example, upon detecting the presence of the non-WPR object.

Figure 4:
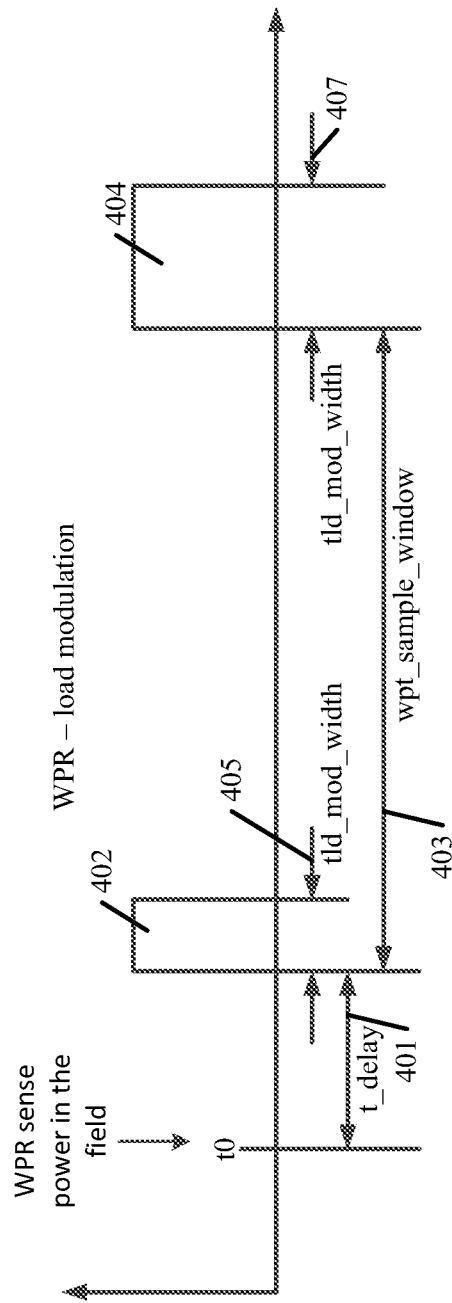
FIG. 4 is a schematic illustration of load modulation events generated by a WPR, in accordance with some demonstrative embodiments.

Reference is made to FIG. 4, which schematically illustrates load modulation events generated by a WPR, in accordance with some demonstrative embodiments. For example, WPR 152 (FIG. 1) may generate the load modulation events of FIG. 4.

As shown in FIG. 4, WPR 152 (FIG. 1) may detect wireless power signal 102 (FIG. 1) at a time, denoted t0.

As shown in FIG. 4, WPR 152 (FIG. 1) may determine the time delay t_delay, e.g., according to Equation 1, WPR 152 (FIG. 1) and may wait for the time delay t_delay 401, for example, from the time t0, prior to beginning load modulation 402 on signal 102 (FIG. 1), e.g., as described above.

As shown in FIG. 4, WPR 152 (FIG. 1) may modulate the load of wireless power signal 102 (FIG. 1) for a duration 405, which is based on the required power of WPR 152 (FIG. 1). For example, WPR 152 (FIG. 1) may modulate the load of wireless power signal 102 (FIG. 1) for the duration $t_{ldmod\_width}$, e.g., according to Equation 3.

As shown in FIG. 4, WPR 152 (FIG. 1) may wait for a interval 403 of WPT_Sample_Window, for example, measured from the beginning of load modulation 402, prior to applying an additional load modulation 404 to wireless power signal 102 (FIG. 1), e.g., as described above.

As shown in FIG. 4, wireless power signal 102 (FIG. 1) may modulate wireless power signal 102 (FIG. 1) for a different, e.g., longer, duration 407, e.g., according to Equation 3, for example, if the required power for WPR 152 changes, e.g., increases.

Figure 5:
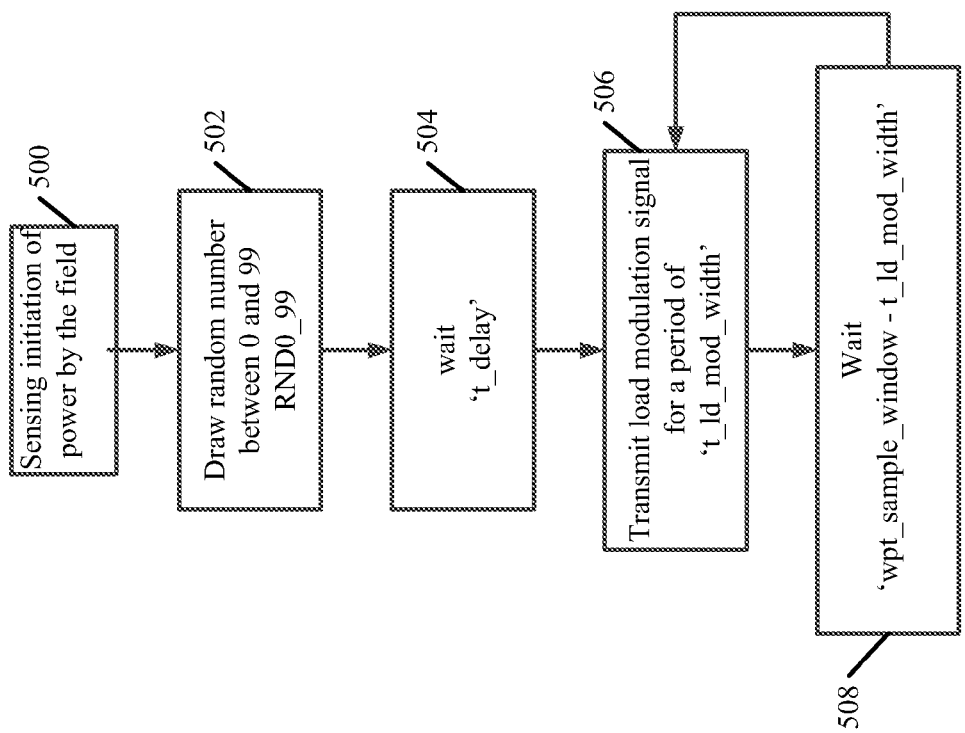
FIG. 5 is a schematic flow-chart illustration of a method of generating load modulation events, in accordance with some demonstrative embodiments.

Reference is made to FIG. 5, which schematically illustrates a method of generating load modulation events, in accordance with some demonstrative embodiments. For example, one or more of the operations of the method of FIG. 5 may be performed by a device, e.g., devices 150, 143 and/or 147 (FIG. 1), a WPR, e.g., WPRs 152, 145 and/or 149 (FIG. 1), and/or a controller, e.g., controller 154 (FIG. 1).

As indicated at block 500, the method may include sensing a magnetic field of a WPT. For example, controller 154 (FIG. 1) may detect the magnetic field generated by WPT 112 (FIG. 1), e.g., as described above.

As indicated at block 502, the method may include randomly selecting a number within the range of integer numbers between 0 and 99. For example, controller 154 (FIG. 1) may randomly select the value RND0_99, e.g., as described above.

As indicated at block 504, the method may include determining the waiting a delay time. For example, controller 154 (FIG. 1) may determine the delay time t_delay, for example, according to Equation 1, e.g., as described above.

As indicated at block 506, the method may include generating a load modulation event for a duration based on a requested power from the WPR. For example, controller 154 (FIG. 1) may control load modulator 155 (FIG. 1) to apply the load to signal 102 (FIG. 1) for the duration $t_{ldmod\_width}$, e.g., as described above.

As indicated at block 508, the method may include waiting for a time interval prior to repeating the load modulation. For example, controller 154 (FIG. 1) may control load modulator 155 (FIG. 1) to repeatedly apply the load to signal 102 (FIG. 1) at the times t, e.g., as described above.

Figure 6:
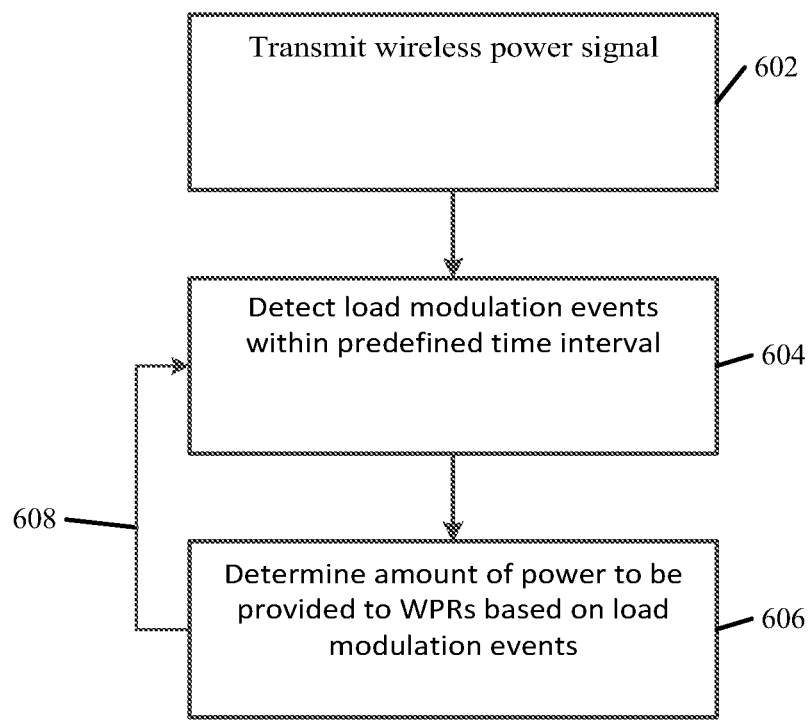
FIG. 6 is a schematic flow-chart illustration of a method of controlling wireless power transfer, in accordance with some demonstrative embodiments.

Reference is made to FIG. 6, which schematically illustrates a method of controlling wireless power transfer, in accordance with some demonstrative embodiments. For example, one or more of the operations of the method of FIG. 6 may be performed by a device, e.g., device 110 (FIG. 1), a WPT, e.g., WPT 112 (FIG. 1), and/or a controller, e.g., controller 114 (FIG. 1).

As indicated at block 602, the method may include transmitting a wireless power signal to be received by a plurality of WPRs. For example, controller 114 (FIG. 10 may control WPT 112 (FIG. 1) to transmit wireless power signal 102 (FIG. 1), e.g., as described above.

As indicated at block 604, the method may include detecting one or more load modulation events within a predefined time interval based on a change in a load on the wireless power signal. For example, controller 114 (FIG. 1) may detect load modulation events generated by WPRs 152, 145 and/or 149 (FIG. 1) based on a change in a load on wireless power signal 102 (FIG. 1), e.g., as described above.

As indicated at block 606, the method may include determining an amount of power to be provided to the plurality of WPRs based on the load modulation events. For example, controller 114 (FIG. 1) may determine the total power to be provided to WPRs 152, 145 and/or 149 (FIG. 1) based on the sum of the durations of the load modulation events generated by WPRs 152, 145 and/or 149 (FIG. 1), e.g., as described above.

As indicated by arrow 608, the method may include repeating the operations of blocks 604 and 606, e.g., to determine the amount of power to be provided to the plurality of WPRs during one or more additional time intervals.

Figure 7:
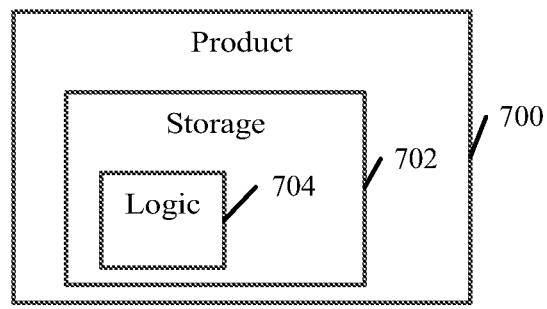
FIG. 7 is a schematic illustration of a product of manufacture, in accordance with some demonstrative embodiments.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of device 110 (FIG. 1), device 150 (FIG. 1), device 143 (FIG. 1), device 147 (FIG. 1), WPT 112 (FIG. 1), controller 114 (FIG. 1), WPR 152 (FIG. 1), WPR 145 (FIG. 1), WPR 149 (FIG. 1), controller 154 (FIG. 1) and/or to perform one or more operations of the methods of FIGS. 5 and/or 6. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus of wireless power transfer, the apparatus comprising a Wireless Power Transmitter (WPT) to transmit a wireless power signal to be received by a plurality of Wireless Power Receivers (WPRs), the WPT is to detect one or more load modulation events within a predefined time interval based on a change in a load on the wireless power signal, and to determine an amount of power to be provided to the plurality of WPRs based on the load modulation events.

Example 2 includes the subject matter of Example 1, and optionally, wherein the WPT is to determine the amount of power to be provided to the plurality of WPRs based on a number of the load modulation events, and durations of the load modulation events.

Example 3 includes the subject matter of Example 2, and optionally, wherein the WPT is to determine the amount of power to be provided to the plurality of WPRs based on a sum of the durations of the load modulation events.

Example 4 includes the subject matter of any one of Examples 1-3, and optionally, wherein the WPT is to adjust a power of the wireless power signal based on the determined amount of power to be provided to the plurality of WPRs.

Example 5 includes the subject matter of any one of Examples 1-4, and optionally, wherein the WPT is to stop transmitting the wireless power signal, when the determined amount of power to be provided to the plurality of WPRs is lesser than an actual power delivered by the wireless power signal.

Example 6 includes the subject matter of any one of Examples 1-5, and optionally, wherein the WPT is to repeatedly detect the load modulation events during a plurality of consecutive time intervals.

Example 7 includes the subject matter of Example 6, and optionally, wherein the WPT is to detect no more than one load modulation event corresponding to each of the WPRs during each time interval.

Example 8 includes the subject matter of any one of Examples 1-7, and optionally, wherein the WPT is to transmit the wireless power signal by generating a magnetic field, and wherein a load modulation event comprises a decrease in a level of the magnetic field.

Example 9 includes the subject matter of any one of Examples 1-8, and optionally, wherein the WPT comprises a transmit (Tx) resonator to generate the wireless power signal, and a detector to detect the load modulation events based on a change in a load on the Tx resonator.

Example 10 includes the subject matter of Example 9, and optionally, wherein the detector is to detect the load modulation events based on at least one parameter selected from the group consisting of a decrease of voltage on the Tx resonator and an increase of a current through the Tx resonator.

Example 11 includes an apparatus of wireless power transfer, the apparatus comprising a Wireless Power Receiver (WPR) to receive a wireless power signal from a Wireless Power Transmitter (WPT), the WPR is to modulate a load on the wireless power signal for a duration based on a requested amount of power, and to repeat modulation of the load on the wireless power signal at a predefined time interval.

Example 12 includes the subject matter of Example 11, and optionally, wherein the WPR is to modulate the load on the wireless power signal for first a duration representing a first requested amount of power, and to modulate the load on the wireless power signal for a second duration representing a second requested amount of power, the second duration is longer than the first duration and the second requested amount of power is greater than the first requested amount of power.

Example 13 includes the subject matter of Example 11 or 12, and optionally, wherein the WPR is to select a delay period and to wait the delay period between detection of the wireless power signal and modulation of the load on the wireless power signal.

Example 14 includes the subject matter of Example 13, and optionally, wherein the WPR is to select the delay period from a predefined range of delay periods, and wherein the duration is lesser than a shortest delay period of the range of delay periods.

Example 15 includes the subject matter of Example 13 or 14, and optionally, wherein the WPR is to randomly select the delay period.

Example 16 includes the subject matter of any one of Examples 13-15, and optionally, wherein the WPR is to repeat the selecting of the delay period upon detecting a reset of the wireless power signal.

Example 17 includes the subject matter of any one of Examples 11-16, and optionally, wherein the WPR is to modulate the load on the wireless power signal by inducing a decrease in a magnetic field of the wireless power signal.

Example 18 includes an apparatus of wireless power transfer, the apparatus comprising a wireless power controller to communicate between a Wireless Power Receiver (WPR) and a Wireless Power Transmitter (WPT) an indication of a requested amount of power to be provided from the WPT to the WPR via a wireless power signal, the indication is in the form of a load modulation event within a predefined time interval, the load modulation event comprises a change in a level of a magnetic field of the wireless power signal, a duration of the load modulation event is based on the requested amount of power to be provided from the WPT to the WPR.

Example 19 includes the subject matter of Example 18, and optionally, wherein the wireless power controller is to communicate between the WPR and WPT a first modulation event having a first duration representing a first requested amount of power, and to communicate between the WPR and WPT a second modulation event having a second duration representing a second requested amount of power, the second duration is longer than the first duration and the second requested amount of power is greater than the first requested amount of power.

Example 20 includes the subject matter of Example 18 or 19 and optionally, comprising the WPT, the wireless power controller to control the WPT to transmit the wireless power signal to be received by a plurality of WPRs including the WPR, to detect one or more load modulation events within the predefined time interval, and to determine an amount of power to be provided to the plurality of WPRs based on the load modulation events.

Example 21 includes the subject matter of Example 20, and optionally, wherein the wireless power controller is to determine the amount of power to be provided to the plurality of WPRs based on a number of the load modulation events, and durations of the load modulation events.

Example 22 includes the subject matter of Example 21, and optionally, wherein the wireless power controller is to determine the amount of power to be provided to the plurality of WPRs based on a sum of the durations of the load modulation events.

Example 23 includes the subject matter of any one of Examples 20-22, and optionally, wherein the wireless power controller is to adjust a power of the wireless power signal based on the determined amount of power to be provided to the plurality of WPRs.

Example 24 includes the subject matter of any one of Examples 20-23, and optionally, wherein the wireless power controller is to stop transmitting the wireless power signal, when the determined amount of power to be provided to the plurality of WPRs is lesser than an actual power delivered by the wireless power signal.

Example 25 includes the subject matter of any one of Examples 20-24, and optionally, wherein the wireless power controller is to repeatedly detect the load modulation events during a plurality of consecutive time intervals.

Example 26 includes the subject matter of Example 25, and optionally, wherein the wireless power controller is to detect no more than one load modulation event corresponding to each of the WPRs during each time interval.

Example 27 includes the subject matter of any one of Examples 20-26, and optionally, wherein the WPT is to transmit the wireless power signal by generating a magnetic field, and wherein a load modulation event comprises a decrease in a level of the magnetic field.

Example 28 includes the subject matter of any one of Examples 20-27, and optionally, wherein the device comprises a transmit (Tx) resonator to generate the wireless power signal, and a detector to detect the load modulation events based on a change in a load on the Tx resonator.

Example 29 includes the subject matter of Example 28, and optionally, wherein the detector is to detect the load modulation events based on at least one parameter selected from the group consisting of a decrease of voltage on the Tx resonator and an increase of a current through the Tx resonator.

Example 30 includes the subject matter of Example 18 or 19 and optionally, comprising the WPR, the wireless power controller is to control the WPR to modulate a load on the wireless power signal for the duration based on the requested amount of power, and to repeat modulation of the load on the wireless power signal at the predefined time interval.

Example 31 includes the subject matter of Example 30, and optionally, wherein the wireless power controller is to select a delay period and to wait the delay period between detection of the wireless power signal and modulation of the load on the wireless power signal.

Example 32 includes the subject matter of Example 31, and optionally, wherein the wireless power controller is to select the delay period from a predefined range of delay periods, and wherein the duration is lesser than a shortest delay period of the range of delay periods.

Example 33 includes the subject matter of Example 31 or 32, and optionally, wherein the wireless power controller is to randomly select the delay period.

Example 34 includes the subject matter of any one of Examples 30-33, and optionally, wherein the wireless power controller is to repeat the selecting of the delay period upon detecting a reset of the wireless power signal.

Example 35 includes the subject matter of any one of Examples 30-34, and optionally, wherein the wireless power controller is to control the WPR to modulate the load on the wireless power signal by inducing a decrease in a magnetic field of the wireless power signal.

Example 36 includes a system of wireless power transfer, the system comprising a device including a wireless power controller to communicate between a Wireless Power Receiver (WPR) and a Wireless Power Transmitter (WPT) an indication of a requested amount of power to be provided from the WPT to the WPR via a wireless power signal, the indication is in the form of a load modulation event within a predefined time interval, the load modulation event comprises a change in a level of a magnetic field of the wireless power signal, a duration of the load modulation event is based on the requested amount of power to be provided from the WPT to the WPR; a processor; and a memory.

Example 37 includes the subject matter of Example 36, and optionally, wherein the wireless power controller is to communicate between the WPR and WPT a first modulation event having a first duration representing a first requested amount of power, and to communicate between the WPR and WPT a second modulation event having a second duration representing a second requested amount of power, the second duration is longer than the first duration and the second requested amount of power is greater than the first requested amount of power.

Example 38 includes the subject matter of Example 36 or 37, and optionally, wherein the device comprises the WPT, the wireless power controller to control the WPT to transmit the wireless power signal to be received by a plurality of WPRs including the WPR, to detect one or more load modulation events within the predefined time interval, and to determine an amount of power to be provided to the plurality of WPRs based on the load modulation events.

Example 39 includes the subject matter of Example 38, and optionally, wherein the wireless power controller is to determine the amount of power to be provided to the plurality of WPRs based on a number of the load modulation events, and durations of the load modulation events.

Example 40 includes the subject matter of Example 39, and optionally, wherein the wireless power controller is to determine the amount of power to be provided to the plurality of WPRs based on a sum of the durations of the load modulation events.

Example 41 includes the subject matter of any one of Examples 38-40, and optionally, wherein the wireless power controller is to adjust a power of the wireless power signal based on the determined amount of power to be provided to the plurality of WPRs.

Example 42 includes the subject matter of any one of Examples 38-41, and optionally, wherein the wireless power controller is to stop transmitting the wireless power signal, when the determined amount of power to be provided to the plurality of WPRs is lesser than an actual power delivered by the wireless power signal.

Example 43 includes the subject matter of any one of Examples 38-42, and optionally, wherein the wireless power controller is to repeatedly detect the load modulation events during a plurality of consecutive time intervals.

Example 44 includes the subject matter of Example 43, and optionally, wherein the wireless power controller is to detect no more than one load modulation event corresponding to each of the WPRs during each time interval.

Example 45 includes the subject matter of any one of Examples 38-44, and optionally, wherein the WPT is to transmit the wireless power signal by generating a magnetic field, and wherein a load modulation event comprises a decrease in a level of the magnetic field.

Example 46 includes the subject matter of any one of Examples 38-45, and optionally, wherein the device comprises a transmit (Tx) resonator to generate the wireless power signal, and a detector to detect the load modulation events based on a change in a load on the Tx resonator.

Example 47 includes the subject matter of Example 46, and optionally, wherein the detector is to detect the load modulation events based on at least one parameter selected from the group consisting of a decrease of voltage on the Tx resonator and an increase of a current through the Tx resonator.

Example 48 includes the subject matter of Example 36 or 37, and optionally, wherein the device comprises the WPR, the wireless power controller is to control the WPR to modulate a load on the wireless power signal for the duration based on the requested amount of power, and to repeat modulation of the load on the wireless power signal at the predefined time interval.

Example 49 includes the subject matter of Example 48, and optionally, wherein the wireless power controller is to select a delay period and to wait the delay period between detection of the wireless power signal and modulation of the load on the wireless power signal.

Example 50 includes the subject matter of Example 49, and optionally, wherein the wireless power controller is to select the delay period from a predefined range of delay periods, and wherein the duration is lesser than a shortest delay period of the range of delay periods.

Example 51 includes the subject matter of Example 49 or 50, and optionally, wherein the wireless power controller is to randomly select the delay period.

Example 52 includes the subject matter of any one of Examples 48-51, and optionally, wherein the wireless power controller is to repeat the selecting of the delay period upon detecting a reset of the wireless power signal.

Example 53 includes the subject matter of any one of Examples 48-52, and optionally, wherein the wireless power controller is to control the WPR to modulate the load on the wireless power signal by inducing a decrease in a magnetic field of the wireless power signal.

Example 54 includes a method of wireless power transfer, the method comprising communicating a wireless power signal between a Wireless Power Transmitter (WPT) and a Wireless Power Receiver (WPR); and communicating between the WPR and WPT an indication of a requested amount of power to be provided from the WPT to the WPR, the indication is in the form of a load modulation event within a predefined time interval, the load modulation event comprises a change in a level of a magnetic field of the wireless power signal, a duration of the load modulation event is based on the requested amount of power to be provided from the WPT to the WPR.

Example 55 includes the subject matter of Example 54 and optionally, comprising communicating between the WPR and WPT a first modulation event having a first duration representing a first requested amount of power, and communicating between the WPR and WPT a second modulation event having a second duration representing a second requested amount of power, the second duration is longer than the first duration and the second requested amount of power is greater than the first requested amount of power.

Example 56 includes the subject matter of Example 54 or 55 and optionally, comprising transmitting the wireless power signal to be received by a plurality of WPRs including the WPR, detecting one or more load modulation events within the predefined time interval, and determining an amount of power to be provided to the plurality of WPRs based on the load modulation events.

Example 57 includes the subject matter of Example 56 and optionally, comprising determining the amount of power to be provided to the plurality of WPRs based on a number of the load modulation events, and durations of the load modulation events.

Example 58 includes the subject matter of Example 57 and optionally, comprising determining the amount of power to be provided to the plurality of WPRs based on a sum of the durations of the load modulation events.

Example 59 includes the subject matter of any one of Examples 56-58 and optionally, comprising adjusting a power of the wireless power signal based on the determined amount of power to be provided to the plurality of WPRs.

Example 60 includes the subject matter of any one of Examples 56-59 and optionally, comprising stopping transmitting the wireless power signal, when the determined amount of power to be provided to the plurality of WPRs is lesser than an actual power delivered by the wireless power signal.

Example 61 includes the subject matter of any one of Examples 56-60 and optionally, comprising repeatedly detecting the load modulation events during a plurality of consecutive time intervals.

Example 62 includes the subject matter of Example 61 and optionally, comprising detecting no more than one load modulation event corresponding to each of the WPRs during each time interval.

Example 63 includes the subject matter of any one of Examples 56-62 and optionally, comprising transmitting the wireless power signal by generating a magnetic field, wherein a load modulation event comprises a decrease in a level of the magnetic field.

Example 64 includes the subject matter of any one of Examples 56-63 and optionally, comprising detecting the load modulation events based on a change in a load on a transmit (Tx) resonator.

Example 65 includes the subject matter of Example 64 and optionally, comprising detecting the load modulation events based on at least one parameter selected from the group consisting of a decrease of voltage on the Tx resonator and an increase of a current through the Tx resonator.

Example 66 includes the subject matter of Example 54 or 55 and optionally, comprising receiving the wireless power signal at the WPR, modulating a load on the wireless power signal for the duration based on the requested amount of power, and repeating modulation of the load on the wireless power signal at the predefined time interval.

Example 67 includes the subject matter of Example 66 and optionally, comprising selecting a delay period and waiting the delay period between detection of the wireless power signal and modulation of the load on the wireless power signal.

Example 68 includes the subject matter of Example 67 and optionally, comprising selecting the delay period from a predefined range of delay periods, wherein the duration is lesser than a shortest delay period of the range of delay periods.

Example 69 includes the subject matter of Example 67 or 68 and optionally, comprising randomly selecting the delay period.

Example 70 includes the subject matter of any one of Examples 66-69 and optionally, comprising repeating the selecting of the delay period upon detecting a reset of the wireless power signal.

Example 71 includes the subject matter of any one of Examples 66-70 and optionally, comprising modulating the load on the wireless power signal by inducing a decrease in a magnetic field of the wireless power signal.

Example 72 includes a product including a non-transitory storage medium having stored thereon instructions that, when executed by a machine, result in transmitting a wireless power signal to be received by a plurality of Wireless Power Receivers (WPRs); detecting one or more load modulation events within a predefined time interval based on a change in a load on the wireless power signal; determining an amount of power to be provided to the plurality of WPRs based on the load modulation events.

Example 73 includes the subject matter of Example 72, and optionally, wherein the instructions result in determining the amount of power to be provided to the plurality of WPRs based on a number of the load modulation events, and durations of the load modulation events.

Example 74 includes the subject matter of Example 73, and optionally, wherein the instructions result in determining the amount of power to be provided to the plurality of WPRs based on a sum of the durations of the load modulation events.

Example 75 includes the subject matter of any one of Examples 72-74, and optionally, wherein the instructions result in adjusting a power of the wireless power signal based on the determined amount of power to be provided to the plurality of WPRs.

Example 76 includes the subject matter of any one of Examples 72-75, and optionally, wherein the instructions result in stopping to transmit the wireless power signal, when the determined amount of power to be provided to the plurality of WPRs is lesser than an actual power delivered by the wireless power signal.

Example 77 includes the subject matter of any one of Examples 72-76, and optionally, wherein the instructions result in repeatedly detecting the load modulation events during a plurality of consecutive time intervals.

Example 78 includes the subject matter of Example 77, and optionally, wherein the instructions result in detecting no more than one load modulation event corresponding to each of the WPRs during each time interval.

Example 79 includes the subject matter of any one of Examples 72-78, and optionally, wherein the instructions result in transmitting the wireless power signal by generating a magnetic field, wherein a load modulation event comprises a decrease in a level of the magnetic field.

Example 80 includes the subject matter of any one of Examples 72-79, and optionally, wherein the instructions result in detecting the load modulation events based on a change in a load on a Transmitter (Tx) resonator.

Example 81 includes the subject matter of Example 80, and optionally, wherein the instructions result in detecting the load modulation events based on at least one parameter selected from the group consisting of a decrease of voltage on the Tx resonator and an increase of a current through the Tx resonator.

Example 82 includes a product including a non-transitory storage medium having stored thereon instructions that, when executed by a machine, result in receiving a wireless power signal from a Wireless Power Transmitter (WPT); modulating a load on the wireless power signal for a duration based on a requested amount of power; and repeating modulation of the load on the wireless power signal at a predefined time interval.

Example 83 includes the subject matter of Example 82, and optionally, wherein the instructions result in modulating the load on the wireless power signal for first a duration representing a first requested amount of power, and modulating the load on the wireless power signal for second duration representing a second requested amount of power, the second duration is longer than the first duration and the second requested amount of power is greater than the first requested amount of power.

Example 84 includes the subject matter of Example 82 or 83, and optionally, wherein the instructions result in selecting a delay period, and waiting the delay period between detection of the wireless power signal and modulation of the load on the wireless power signal.

Example 85 includes the subject matter of Example 84, and optionally, wherein the instructions result in selecting the delay period from a predefined range of delay periods, and wherein the duration is lesser than a shortest delay period of the range of delay periods.

Example 86 includes the subject matter of Example 84 or 85, and optionally, wherein the instructions result in randomly selecting the delay period.

Example 87 includes the subject matter of any one of Examples 84-86, and optionally, wherein the instructions result in repeating the selecting of the delay period upon detecting a reset of the wireless power signal.

Example 88 includes the subject matter of any one of Examples 82-87, and optionally, wherein the instructions result in modulating the load on the wireless power signal by inducing a decrease in a magnetic field of the wireless power signal.

Example 89 includes a product including a non-transitory storage medium having stored thereon instructions that, when executed by a machine, result in communicating a wireless power signal between a Wireless Power Transmitter (WPT) and a Wireless Power Receiver (WPR); and communicating between the WPR and WPT an indication of a requested amount of power to be provided from the WPT to the WPR, the indication is in the form of a load modulation event within a predefined time interval, the load modulation event comprises a change in a level of a magnetic field of the wireless power signal, a duration of the load modulation event is based on the requested amount of power to be provided from the WPT to the WPR.

Example 90 includes the subject matter of Example 89, and optionally, wherein the instructions result in communicating between the WPR and WPT a first modulation event having a first duration representing a first requested amount of power, and communicating between the WPR and WPT a second modulation event having a second duration representing a second requested amount of power, the second duration is longer than the first duration and the second requested amount of power is greater than the first requested amount of power.

Example 91 includes the subject matter of Example 89 or 90, and optionally, wherein the instructions result in transmitting the wireless power signal to be received by a plurality of WPRs including the WPR, detecting one or more load modulation events within the predefined time interval, and determining an amount of power to be provided to the plurality of WPRs based on the load modulation events.

Example 92 includes the subject matter of Example 91, and optionally, wherein the instructions result in determining the amount of power to be provided to the plurality of WPRs based on a number of the load modulation events, and durations of the load modulation events.

Example 93 includes the subject matter of Example 92, and optionally, wherein the instructions result in determining the amount of power to be provided to the plurality of WPRs based on a sum of the durations of the load modulation events.

Example 94 includes the subject matter of any one of Examples 91-93, and optionally, wherein the instructions result in adjusting a power of the wireless power signal based on the determined amount of power to be provided to the plurality of WPRs.

Example 95 includes the subject matter of any one of Examples 91-94, and optionally, wherein the instructions result in stopping transmitting the wireless power signal, when the determined amount of power to be provided to the plurality of WPRs is lesser than an actual power delivered by the wireless power signal.

Example 96 includes the subject matter of any one of Examples 91-95, and optionally, wherein the instructions result in repeatedly detecting the load modulation events during a plurality of consecutive time intervals.

Example 97 includes the subject matter of Example 96, and optionally, wherein the instructions result in detecting no more than one load modulation event corresponding to each of the WPRs during each time interval.

Example 98 includes the subject matter of any one of Examples 91-97, and optionally, wherein the instructions result in transmitting the wireless power signal by generating a magnetic field, wherein a load modulation event comprises a decrease in a level of the magnetic field.

Example 99 includes the subject matter of any one of Examples 91-98, and optionally, wherein the instructions result in detecting the load modulation events based on a change in a load on a transmit (Tx) resonator.

Example 100 includes the subject matter of Example 99, and optionally, wherein the instructions result in detecting the load modulation events based on at least one parameter selected from the group consisting of a decrease of voltage on the Tx resonator and an increase of a current through the Tx resonator.

Example 101 includes the subject matter of Example 89 or 90, and optionally, wherein the instructions result in receiving the wireless power signal at the WPR, modulating a load on the wireless power signal for the duration based on the requested amount of power, and repeating modulation of the load on the wireless power signal at the predefined time interval.

Example 102 includes the subject matter of Example 101, and optionally, wherein the instructions result in selecting a delay period and waiting the delay period between detection of the wireless power signal and modulation of the load on the wireless power signal.

Example 103 includes the subject matter of Example 102, and optionally, wherein the instructions result in selecting the delay period from a predefined range of delay periods, wherein the duration is lesser than a shortest delay period of the range of delay periods.

Example 104 includes the subject matter of Example 102 or 103, and optionally, wherein the instructions result in randomly selecting the delay period.

Example 105 includes the subject matter of any one of Examples 101-104, and optionally, wherein the instructions result in repeating the selecting of the delay period upon detecting a reset of the wireless power signal.

Example 106 includes the subject matter of any one of Examples 101-105, and optionally, wherein the instructions result in modulating the load on the wireless power signal by inducing a decrease in a magnetic field of the wireless power signal.

Example 107 includes an apparatus comprising means for transmitting a wireless power signal to be received by a plurality of Wireless Power Receivers (WPRs); means for detecting one or more load modulation events within a predefined time interval based on a change in a load on the wireless power signal; and means for determining an amount of power to be provided to the plurality of WPRs based on the load modulation events.

Example 108 includes the subject matter of Example 107 and optionally, comprising means for determining the amount of power to be provided to the plurality of WPRs based on a number of the load modulation events, and durations of the load modulation events.

Example 109 includes the subject matter of Example 108 and optionally, comprising means for determining the amount of power to be provided to the plurality of WPRs based on a sum of the durations of the load modulation events.

Example 110 includes the subject matter of any one of Examples 107-109 and optionally, comprising means for adjusting a power of the wireless power signal based on the determined amount of power to be provided to the plurality of WPRs.

Example 111 includes the subject matter of any one of Examples 107-110 and optionally, comprising means for stopping to transmit the wireless power signal, when the determined amount of power to be provided to the plurality of WPRs is lesser than an actual power delivered by the wireless power signal.

Example 112 includes the subject matter of any one of Examples 107-111 and optionally, comprising means for repeatedly detecting the load modulation events during a plurality of consecutive time intervals.

Example 113 includes the subject matter of Example 112 and optionally, comprising means for detecting no more than one load modulation event corresponding to each of the WPRs during each time interval.

Example 114 includes the subject matter of any one of Examples 107-113 and optionally, comprising means for transmitting the wireless power signal by generating a magnetic field, wherein a load modulation event comprises a decrease in a level of the magnetic field.

Example 115 includes the subject matter of any one of Examples 107-114 and optionally, comprising means for detecting the load modulation events based on a change in a load on a Transmitter (Tx) resonator.

Example 116 includes the subject matter of Example 115 and optionally, comprising means for detecting the load modulation events based on at least one parameter selected from the group consisting of a decrease of voltage on the Tx resonator and an increase of a current through the Tx resonator.

Example 117 includes an apparatus of wireless power transfer, the apparatus comprising means for receiving a wireless power signal from a Wireless Power Transmitter (WPT); means for modulating a load on the wireless power signal for a duration based on a requested amount of power; and means for repeating modulation of the load on the wireless power signal at a predefined time interval.

Example 118 includes the subject matter of Example 117 and optionally, comprising means for modulating the load on the wireless power signal for first a duration representing a first requested amount of power, and modulating the load on the wireless power signal for second duration representing a second requested amount of power, the second duration is longer than the first duration and the second requested amount of power is greater than the first requested amount of power.

Example 119 includes the subject matter of Example 117 or 118 and optionally, comprising means for selecting a delay period, and waiting the delay period between detection of the wireless power signal and modulation of the load on the wireless power signal.

Example 120 includes the subject matter of Example 119 and optionally, comprising means for selecting the delay period from a predefined range of delay periods, and wherein the duration is lesser than a shortest delay period of the range of delay periods.

Example 121 includes the subject matter of Example 119 or 120 and optionally, comprising means for randomly selecting the delay period.

Example 122 includes the subject matter of any one of Examples 119-121 and optionally, comprising means for repeating the selecting of the delay period upon detecting a reset of the wireless power signal.

Example 123 includes the subject matter of any one of Examples 107-122 and optionally, comprising means for modulating the load on the wireless power signal by inducing a decrease in a magnetic field of the wireless power signal.

Example 124 includes an apparatus of wireless power transfer, the apparatus comprising means for communicating a wireless power signal between a Wireless Power Transmitter (WPT) and a Wireless Power Receiver (WPR); and means for communicating between the WPR and WPT an indication of a requested amount of power to be provided from the WPT to the WPR, the indication is in the form of a load modulation event within a predefined time interval, the load modulation event comprises a change in a level of a magnetic field of the wireless power signal, a duration of the load modulation event is based on the requested amount of power to be provided from the WPT to the WPR.

Example 125 includes the subject matter of Example 124 and optionally, comprising means for communicating between the WPR and WPT a first modulation event having a first duration representing a first requested amount of power, and communicating between the WPR and WPT a second modulation event having a second duration representing a second requested amount of power, the second duration is longer than the first duration and the second requested amount of power is greater than the first requested amount of power.

Example 126 includes the subject matter of Example 124 or 125 and optionally, comprising means for transmitting the wireless power signal to be received by a plurality of WPRs including the WPR, detecting one or more load modulation events within the predefined time interval, and determining an amount of power to be provided to the plurality of WPRs based on the load modulation events.

Example 127 includes the subject matter of Example 126 and optionally, comprising means for determining the amount of power to be provided to the plurality of WPRs based on a number of the load modulation events, and durations of the load modulation events.

Example 128 includes the subject matter of Example 127 and optionally, comprising means for determining the amount of power to be provided to the plurality of WPRs based on a sum of the durations of the load modulation events.

Example 129 includes the subject matter of any one of Examples 126-128 and optionally, comprising means for adjusting a power of the wireless power signal based on the determined amount of power to be provided to the plurality of WPRs.

Example 130 includes the subject matter of any one of Examples 126-129 and optionally, comprising means for stopping transmitting the wireless power signal, when the determined amount of power to be provided to the plurality of WPRs is lesser than an actual power delivered by the wireless power signal.

Example 131 includes the subject matter of any one of Examples 126-130 and optionally, comprising means for repeatedly detecting the load modulation events during a plurality of consecutive time intervals.

Example 132 includes the subject matter of Example 131 and optionally, comprising means for detecting no more than one load modulation event corresponding to each of the WPRs during each time interval.

Example 133 includes the subject matter of any one of Examples 126-132 and optionally, comprising means for transmitting the wireless power signal by generating a magnetic field, wherein a load modulation event comprises a decrease in a level of the magnetic field.

Example 134 includes the subject matter of any one of Examples 126-133 and optionally, comprising means for detecting the load modulation events based on a change in a load on a transmit (Tx) resonator.

Example 135 includes the subject matter of Example 134 and optionally, comprising means for detecting the load modulation events based on at least one parameter selected from the group consisting of a decrease of voltage on the Tx resonator and an increase of a current through the Tx resonator.

Example 136 includes the subject matter of Example 124 or 125 and optionally, comprising means for receiving the wireless power signal at the WPR, modulating a load on the wireless power signal for the duration based on the requested amount of power, and repeating modulation of the load on the wireless power signal at the predefined time interval.

Example 137 includes the subject matter of Example 136 and optionally, comprising means for selecting a delay period and waiting the delay period between detection of the wireless power signal and modulation of the load on the wireless power signal.

Example 138 includes the subject matter of Example 137 and optionally, comprising means for selecting the delay period from a predefined range of delay periods, wherein the duration is lesser than a shortest delay period of the range of delay periods.

Example 139 includes the subject matter of Example 137 or 138 and optionally, comprising means for randomly selecting the delay period.

Example 140 includes the subject matter of any one of Examples 136-139 and optionally, comprising means for repeating the selecting of the delay period upon detecting a reset of the wireless power signal.

Example 141 includes the subject matter of any one of Examples 136-140 and optionally, comprising means for modulating the load on the wireless power signal by inducing a decrease in a magnetic field of the wireless power signal.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus of wireless power transfer, the apparatus comprising:
 a Wireless Power Transmitter (WPT) to transmit a wireless power signal to be received by a plurality of Wireless Power Receivers (WPRs), wherein said WPT is to detect one or more load modulation events within a predefined time interval based on a change in a load on said wireless power signal, and to determine an amount of power to be provided to said plurality of WPRs based on a number of said load modulation events and durations of said load modulation events, wherein said WPT is to determine the amount of power to be provided to said plurality of WPRs based on a sum of the durations of said load modulation events.

2. The apparatus of claim 1, wherein said WPT is to adjust a power of said wireless power signal based on the determined amount of power to be provided to said plurality of WPRs.

3. The apparatus of claim 1, wherein said WPT is to stop transmitting said wireless power signal, when the determined amount of power to be provided to said plurality of WPRs is lesser than an actual power delivered by said wireless power signal.

4. The apparatus of claim 1, wherein said WPT is to repeatedly detect said load modulation events during a plurality of consecutive time intervals.

5. The apparatus of claim 4, wherein said WPT is to detect no more than one load modulation event corresponding to each of said WPRs during each time interval.

6. The apparatus of claim 1, wherein said WPT is to transmit said wireless power signal by generating a magnetic field, and wherein a load modulation event comprises a decrease in a level of said magnetic field.

7. The apparatus of claim 1, wherein said WPT comprises a transmit (Tx) resonator to generate said wireless power signal, and a detector to detect said load modulation events based on a change in a load on said Tx resonator.

8. The apparatus of claim 7, wherein said detector is to detect said load modulation events based on at least one parameter selected from the group consisting of a decrease of voltage on said Tx resonator and an increase of a current through said Tx resonator.

9. A product including a non-transitory, tangible storage medium having stored thereon instructions that, when executed by a machine, cause a Wireless Power Transmitter (WPT) to:
transmit a wireless power signal to be received by a plurality of Wireless Power Receivers (WPRs);
detect one or more load modulation events within a predefined time interval based on a change in a load on said wireless power signal; and
determine an amount of power to be provided to said plurality of WPRs based on a number of said load modulation events and durations of said load modulation events, wherein said instructions, when executed, cause the WPT to determine the amount of power to be provided to said plurality of WPRs based on a sum of the durations of said load modulation events.

10. The product of claim 9, wherein said instructions, when executed, cause the WPT to adjust a power of said wireless power signal based on the determined amount of power to be provided to said plurality of WPRs.

11. The product of claim 9, wherein said instructions, when executed, cause the WPT to stop transmitting said wireless power signal, when the determined amount of power to be provided to said plurality of WPRs is lesser than an actual power delivered by said wireless power signal.

12. The product of claim 9, wherein said instructions, when executed, cause the WPT to repeatedly detect said load modulation events during a plurality of consecutive time intervals.

13. The product of claim 12, wherein said instructions, when executed, cause the WPT to detect no more than one load modulation event corresponding to each of said WPRs during each time interval.

* * * * *